US011828472B2

(12) United States Patent
Bang et al.

(10) Patent No.: US 11,828,472 B2
(45) Date of Patent: Nov. 28, 2023

(54) COOKING APPARATUS

(71) Applicant: Samsung Electronics Co., Ltd., Suwon-si (KR)

(72) Inventors: Dae Han Bang, Suwon-si (KR); Beom Gon Kim, Suwon-si (KR); Sung Kwang Kim, Suwon-si (KR); Ji Heon Ryu, Suwon-si (KR); Jea Won Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 16/972,544

(22) PCT Filed: May 13, 2019

(86) PCT No.: PCT/KR2019/005722
§ 371 (c)(1),
(2) Date: Dec. 4, 2020

(87) PCT Pub. No.: WO2019/235750
PCT Pub. Date: Dec. 12, 2019

(65) Prior Publication Data
US 2021/0239322 A1 Aug. 5, 2021

(30) Foreign Application Priority Data
Jun. 4, 2018 (KR) .......................... 10-2018-0064171

(51) Int. Cl.
*F24C 3/12* (2006.01)
*F16K 31/60* (2006.01)
*F16K 35/04* (2006.01)

(52) U.S. Cl.
CPC .............. *F24C 3/126* (2013.01); *F16K 31/60* (2013.01); *F16K 35/04* (2013.01)

(58) Field of Classification Search
CPC ........ F16K 35/025; F16K 35/04; F16K 31/60; F24C 3/126
(Continued)

(56) References Cited

U.S. PATENT DOCUMENTS 6,375,150 B1 * 4/2002 Aguirre-Esponda ........................ F16K 35/025 251/96
2020/0300475 A1 * 9/2020 Ibrahim ................. G05G 1/082

FOREIGN PATENT DOCUMENTS

KR 10-0336516 B1 5/2002
KR 10-2003-0053650 A 7/2003
(Continued)

OTHER PUBLICATIONS

International Search Report and Written Opinion of the International Searching Authority in connection with International Application No. PCT/KR2019/005722 dated Aug. 29, 2019, 9 pages.
(Continued)

*Primary Examiner* — Vivek K Shirsat

(57) ABSTRACT

The present disclosure relates to a cooking apparatus including a knob assembly used to operate the cooking apparatus. The cooking apparatus includes a main body comprising a control panel, a valve disposed inside the main body and comprising a valve shaft configured to be movable, and a knob assembly comprising a knob cover rotatably disposed on the control panel, and a knob body configured to be pushed separately from the knob cover to push the valve shaft so that the valve shaft is prevented from being pushed by the knob cover.

13 Claims, 12 Drawing Sheets

(58) Field of Classification Search
USPC .............................................. 126/42; 251/96
See application file for complete search history.

(56) References Cited

FOREIGN PATENT DOCUMENTS

| KR | 20050081367 A | 8/2005 |
|---|---|---|
| KR | 10-1140121 B1 | 4/2012 |
| KR | 20160041220 A | 4/2016 |
| KR | 10-2016-0115106 A | 10/2016 |

OTHER PUBLICATIONS

Korean Intellectual Property Office, "Notice of Preliminary Rejection," dated Apr. 20, 2022, in connection with Korean Patent Application No. 10-2018-0064171, 12 pages.
Korean Intellectual Property Office, "Notice of Patent Allowance," dated Apr. 18, 2023, in connection with Korean Patent Application No. 10-2018-0064171, 4 pages.

* cited by examiner

COOKING APPARATUS

CROSS-REFERENCE TO RELATED APPLICATIONS

This application is a 371 National Stage of International Application No. PCT/KR2019/005722, filed May 13, 2019, which claims priority to Korean Patent Application No. 10-2018-0064171, filed Jun. 4, 2018, the disclosures of which are herein incorporated by reference in their entirety.

BACKGROUND

1. Field

The present disclosure relates to a cooking apparatus including a knob assembly used to operate the cooking apparatus.

2. Description of Related Art

Generally, a cooking apparatus is an apparatus for cooking foods and includes a cooking compartment, a heating device applying heat to the cooking compartment, and a circulation device circulating the heat generated by the heating device in the cooking compartment.

The cooking apparatus, which is an apparatus for sealing, heating, and cooking an object to be cooked, may be generally classified into an electric-type oven, a gas-type oven, and a microwave range depending on a heat source of the heating device.

As an example, the electric-type oven uses an electric heater as a heat source, and the gas-type oven and the microwave range use heat generated by gas and friction heat of water molecules caused by a high frequency as heat sources, respectively.

The cooking apparatus may be provided with a control panel on either a front surface or an upper surface of a main body. The control panel may be provided with a plurality of buttons, keypads, knob assemblies, etc. configured to set a cooking mode desired by a user or set various conditions necessary for cooking.

In particular, when a knob assembly is provided on the control panel, the user may rotate the knob assembly to control the operation of the main body.

In general, the knob assembly may be operated in a push-to-turn manner by the characteristics of a valve for driving a heating source.

The user may control the operation of the main body through the knob assembly by using a two-step mechanism that pushes the knob assembly so that a valve shaft of the valve is pushed and then rotates the knob assembly.

When the user unintentionally pushes and turns the knob assembly, fire, burns, and the like may occur. Accordingly, the cooking apparatus may include a knob stopper or a knob cap capable of being opened and closed in order to prevent unintended operation of the knob assembly.

However, in order for the user to use the knob assembly, the knob stopper needs to be released first and the knob cap needs to be opened first, so that the two-step mechanism may be changed to a three-step mechanism.

In addition, the knob stopper and the knob cap may degrade the overall design of the cooking apparatus, and may be deformed due to heat generated when the cooking apparatus is used.

SUMMARY

The present disclosure is directed to providing a cooking apparatus including an improved knob assembly to prevent unintended operation of the knob assembly without a separate additional structure.

The present disclosure is directed to providing a cooking apparatus including an improved knob assembly to include a knob body that is pushed separately from a knob cover in order to prevent unintended operation of the knob assembly.

The present disclosure is directed to providing a cooking apparatus including an improved knob assembly to include a coupling member for assembling a knob body with a knob cover to be movable in order to prevent unintended operation of the knob assembly.

One aspect of the present disclosure provides a cooking apparatus including a main body including a control panel, a valve disposed inside the main body and including a valve shaft configured to be movable, and a knob assembly including a knob cover rotatably disposed on the control panel, and a knob body configured to be pushed separately from the knob cover to push the valve shaft so that the valve shaft is prevented from being pushed by the knob cover.

The knob cover may include a cover body configured such that a portion of the knob body is accommodated and a cover handle extending from the cover body to be gripped by a user, and the knob assembly may further include a knob base disposed near the cover body to prevent the knob cover from being pushed.

A distance by which one end of the cover body is spaced apart from one end of the facing knob base may be shorter than a distance to which the valve shaft is moved to open the valve.

The knob assembly may further include a coupling member configured to couple the knob cover and the knob body so that the knob body is movable.

The coupling member may include a coupling portion coupled to the knob cover and a head portion configured to restrict the movement of the knob body, and the head portion may be spaced apart from a body hole of the knob body configured such that the coupling member passes therethrough.

The knob body may include a body portion covered by the cover body and a push portion extending from the body portion, and the knob assembly may further include an elastic member disposed near the push portion so that the knob body pulls the valve shaft.

The elastic member may be disposed between the head portion and one end portion of the push portion facing each other.

The elastic member and the head portion may be accommodated in the knob body.

The coupling member may further include a guide portion provided between the coupling portion and the head portion to guide the movement of the knob body.

The elastic member may be disposed on the guide portion.

A distance by which one end of the cover handle is spaced apart from one end of the facing knob body may be longer than a distance by which one end of the cover body is spaced apart from one end of the facing knob base.

A distance by which one end of the cover body is spaced apart from one end of the facing knob base may be longer than a distance to which the valve shaft is moved to open the valve.

The knob assembly may further include an elastic member disposed between the cover handle and one end of the knob body facing each other.

The knob cover may include a touch portion configured to control that the valve shaft is pushed by the knob cover.

The knob cover may include a switch configured to control that the valve shaft is pushed by the knob cover.

A cooking apparatus according to the present disclosure can prevent unintended operation of a knob assembly without a separate additional structure by improving the structure of the knob assembly.

The cooking apparatus according to the present disclosure can prevent unintended operation of the knob assembly by including a knob body that is pushed separately from a knob cover.

The cooking apparatus according to the present disclosure can prevent unintended operation of the knob assembly by including a coupling member for assembling the knob body with the knob cover to be movable.

DETAILED DESCRIPTION

Figure 1:
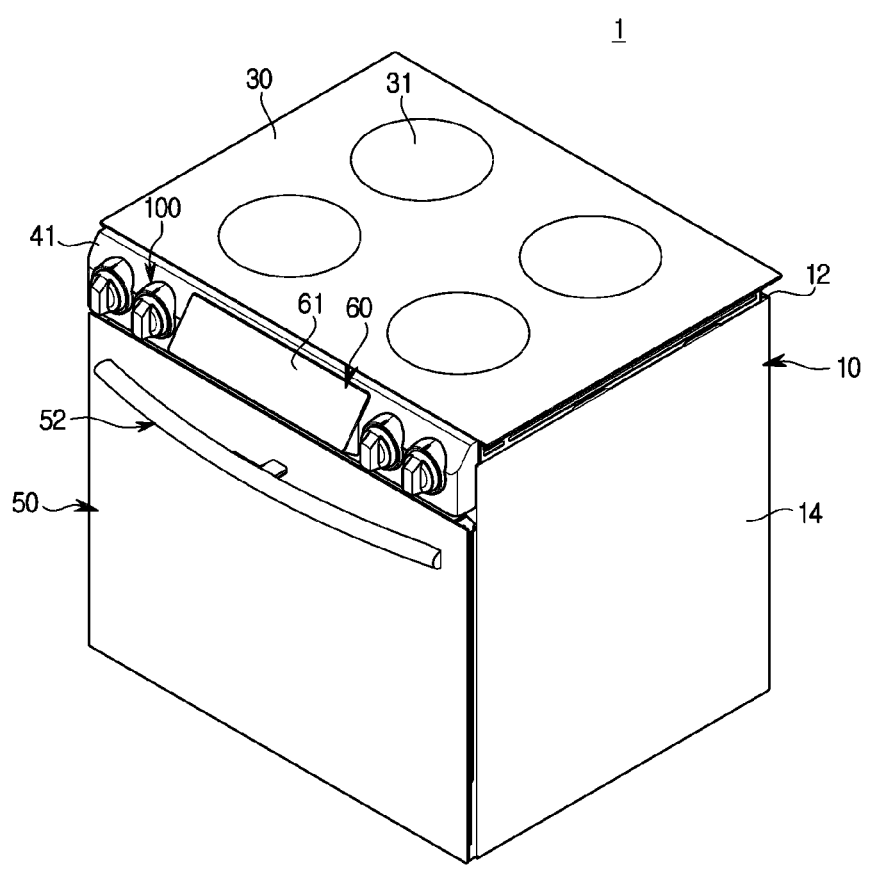
FIG. 1 is a perspective view of a cooking apparatus according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise.

The terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms, and these terms are only used to distinguish one component from another.

For example, without departing from the scope of the present disclosure, the first component may be referred to as a second component, and similarly, the second component may also be referred to as a first component. The term "and/or" includes any combination of a plurality of related items or any one of a plurality of related items.

In this specification, the terms "front end," "rear end," "upper portion," "lower portion," "upper end" and "lower end" used in the following description are defined with reference to the drawings, and the shape and position of each component are not limited by these terms.

Hereinafter, embodiments of the present disclosure will be described in detail with reference to the accompanying drawings. Hereinafter, although a cooking apparatus 1 according to an embodiment of the present disclosure will be described by taking an oven range including an oven as an example, when a control panel is applied, the embodiments of the present disclosure may be applied to a cooking apparatus that does not include an oven.

Figure 2:
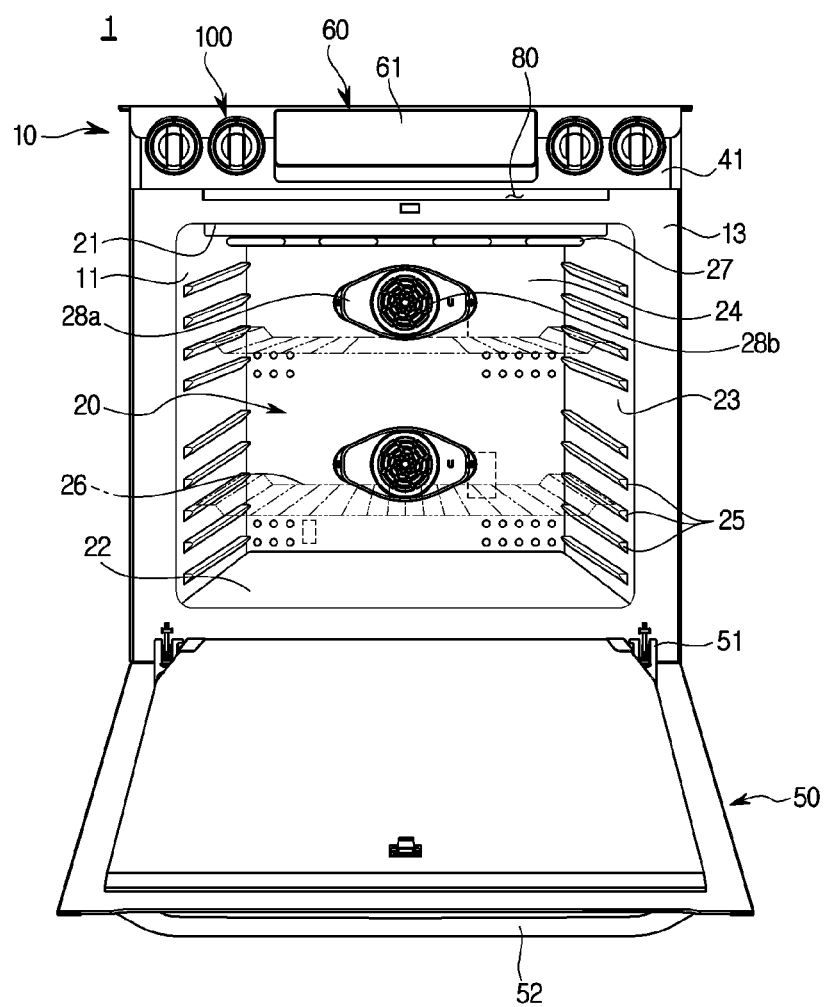
FIG. 2 illustrates that a door is opened in the cooking apparatus according to an embodiment of the present disclosure.
Figure 3:
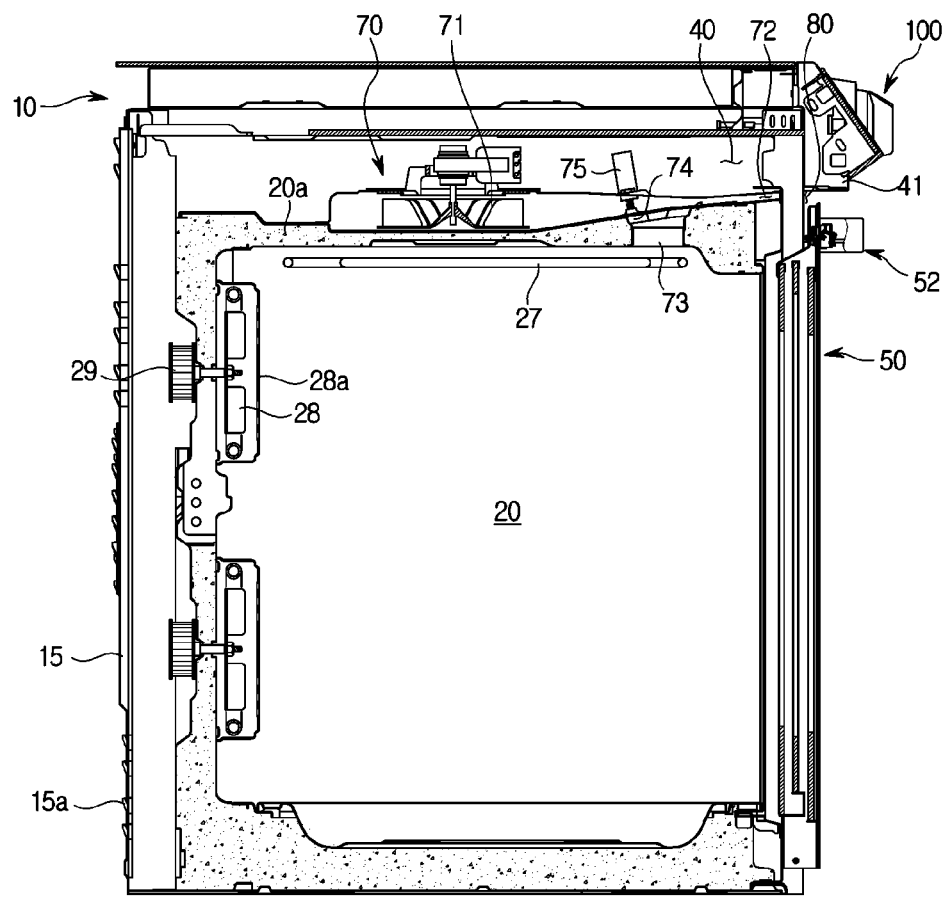
FIG. 3 is a side cross-sectional view of the cooking apparatus according to an embodiment of the present disclosure.

FIG. 1 is a perspective view of a cooking apparatus according to an embodiment of the present disclosure. FIG. 2 illustrates that a door is opened in the cooking apparatus according to an embodiment of the present disclosure. FIG. 3 is a side cross-sectional view of the cooking apparatus according to an embodiment of the present disclosure.

As illustrated in FIGS. 1 to 3, the cooking apparatus 1 may include a main body 10 including an inner case 11 in which a cooking compartment 20 is formed and an outer case 12 coupled to an outer side of the inner case 11 to form an outer appearance of the cooking apparatus 1.

The inner case 11 and the outer case 12 may have a substantially box shape with an open front side.

The cooking apparatus 1 may include a cooktop 30 provided on the top of the cooking apparatus 1 to heat a container containing food placed thereon. At least one heating part 31 may be provided on the cooktop 30. The container containing the food may be directly heated by being placed in the heating part 31.

The cooking apparatus 1 may include a door 50 provided on a front side of the main body 10 to open and close the cooking compartment 20.

The outer case 12 may include a front panel 13 forming a front surface of the main body 10, a side panel 14 forming side surfaces of the main body 10, and a rear panel 15 forming a rear surface of the main body 10.

An opening is provided on the front panel 13, and the front side of the cooking compartment 20 provided inside the main body 10 may be opened by the opening. A control panel 41 covering a front side of an electric component chamber 40 may be provided on a front upper side of the front panel 13. A display module 60 may be mounted on the control panel 41.

The control panel 41 may be disposed on at least a portion of the main body 10. According to an embodiment of the present disclosure, the control panel 41 may be disposed on one side of the front side of the main body 10. However, the present disclosure is not limited thereto, and the control panel 41 may be disposed on an upper surface of the main body 10 or may form one surface of the main body 10.

The rear panel 15 may be provided with an inlet 15a so that air is sucked into the electric component chamber 40. Air sucked into the electric component chamber 40 through the inlet 15a may flow inside the electric component chamber 40 to cool electric components.

However, the present disclosure is not limited thereto, and the inlet 15a may be formed on various positions within a limit in which the inlet 15a may guide outside air to be introduced into the electric component chamber 40.

The cooking compartment 20 may be formed by a top plate 21, a bottom plate 22, opposite side plates 23, and a rear plate 24. The cooking compartment 20, which is a cooking space, is opened at a front side thereof through the opening of the front panel 13 so that food may be put in and out.

A plurality of support bars 25 may be provided on inner surfaces of the opposite side plates 23. At least one detachable rack 26 on which food may be placed may be mounted on the plurality of support bars 25.

Rails (not shown) may be installed on the plurality of support bars 25 so that the rack 26 may slide thereon. A user may move the rack 26 through the rails (not shown) to take out or place food.

A divider (not shown) capable of dividing the cooking compartment 20 into a plurality of spaces may be detachably mounted on the plurality of support bars 25. The plurality of spaces in the cooking compartment 20 divided by the divider do not have to have the same size, and the sizes may be different from each other.

Through this, the user may variously utilize the plurality of spaces in the cooking compartment 20 according to his or her intention. The divider may be made of an insulating material to insulate the spaces of the cooking compartment 20.

The cooking compartment 20 may be provided with a heater 27 for heating food, and the heater 27 may be an electric heater including an electric resistor. However, the present disclosure is not limited thereto, and the heater 27 may be a gas heater that generates heat by burning gas. Thus, the cooking apparatus 1 may include an electric oven and a gas oven.

The rear plate 24 of the cooking compartment 20 may be provided with a circulation fan 28 to circulate air in the cooking compartment 20 so food is heated evenly, and a circulation motor 29 to drive the circulation fan 28.

A fan cover 28a covering the circulation fan 28 may be provided on a front side of the circulation fan 28, and outlet holes 28b through which air flows may be formed on the fan cover 28a.

The open front side of the cooking compartment 20 is opened and closed by the door 50, and the door 50 may be coupled to the main body 10 by a hinge 51 provided at a lower portion of the main body 10 to be rotatable with respect to the main body 10.

A handle 52 to be gripped by the user may be provided on a front upper side of the door 50 so that the door 50 opens and closes the cooking compartment 20.

The display module 60 configured to display various operation information of the cooking apparatus 1 and allow the user to input an operation command may be mounted on the control panel 41 provided on the front upper side of the front panel 13.

The display module 60 may include a liquid crystal display (LCD), and the liquid crystal display may display electrical information as visual information by using a change in liquid crystal transmittance according to an applied voltage.

The liquid crystal display may include a liquid crystal module displaying an image and a light source unit emitting light to the liquid crystal module, and light emitting diodes (LEDs) may be used as the light source unit.

The display module 60 may include a cover panel 61 provided on a front side of the liquid crystal display. The cover panel 61 may simply be a protective panel for protecting the liquid crystal display, but may be a touch panel capable of receiving a touch command of the user.

A knob assembly 100 capable of operating the cooking apparatus 1 may be provided on the control panel 41. According to an embodiment of the present disclosure, four of the knob assemblies 100 may be provided. However, the present disclosure is not limited thereto. A detailed description of the knob assembly 100 will be given below.

An insulating material 20a insulating the electric component chamber 40 and the cooking compartment 20 to prevent heat in the cooking compartment 20 from being transmitted to the electric component chamber 40 may be provided between the electric component chamber 40 and the cooking compartment 20.

The insulating material 20a may cover not only between the electric component chamber 40 and the cooking compartment 20, but also the outside of the cooking compartment 20 as a whole to prevent heat in the cooking compartment 20 from being transmitted to the outside of the cooking apparatus 1.

Because a temperature inside the electric component chamber 40 may increase by the heat generated from various electric components, the cooking apparatus 1 may be provided with a blowing device 70 capable of cooling the electric component chamber 40 by circulating air around the electric component chamber 40.

The blowing device 70 may include a blowing fan 71 configured to flow air, and a discharge passage 72 provided to discharge the air sucked by the blowing fan 71 to the front of the cooking apparatus 1.

The blowing fan 71 may suck air in an axial direction and discharge the air in a radial direction. That is, the blowing fan 71 according to the present disclosure may be a centrifugal fan. However, the present disclosure is not limited thereto, and unlike the present embodiment, the blowing fan 71 may include an axial fan.

Outside air may be sucked into the electric component chamber 40 through the inlet 15a formed on the rear panel 15, and the air sucked into the electric component chamber 40 may flow inside the electric component chamber 40 to cool electric components and then be discharged to the front of the cooking apparatus 1 through an outlet 80 along the discharge passage 72.

The outlet 80 may include a space between the front panel 13 and the control panel 41. However, the present disclosure is not limited thereto, and the outlet 80 may be provided on various positions and may have various shapes, within a limit in which air sucked through the inlet 15*a* may be discharged to the outside of the main body 1.

A part of air in the cooking compartment 20) may be sucked into the discharge passage 72 through a cooking compartment passage 73 and discharged to the front of the cooking apparatus 1.

A bypass hole 74 for introducing a part of air flowing from the discharge passage 72 to the outlet 80 into the cooking compartment passage 73 may be formed on the discharge passage 72, and the bypass hole 74 may be opened and closed by an opening/closing device 75.

According to the opening and closing of the bypass hole 74 by the opening/closing device 75, an amount in which a part of air flowing from the discharge passage 72 to the outlet 80 is introduced into the cooking compartment passage 73 is adjusted, so that an amount of air exhausted from the cooking compartment 20 to the cooking compartment passage 73 may be adjusted.

The door 50 rotatably coupled to the front side of the main body 10 to open and close the cooking compartment 20 may include a plurality of doors. The door 50 may include a plurality of glasses.

Figure 4:
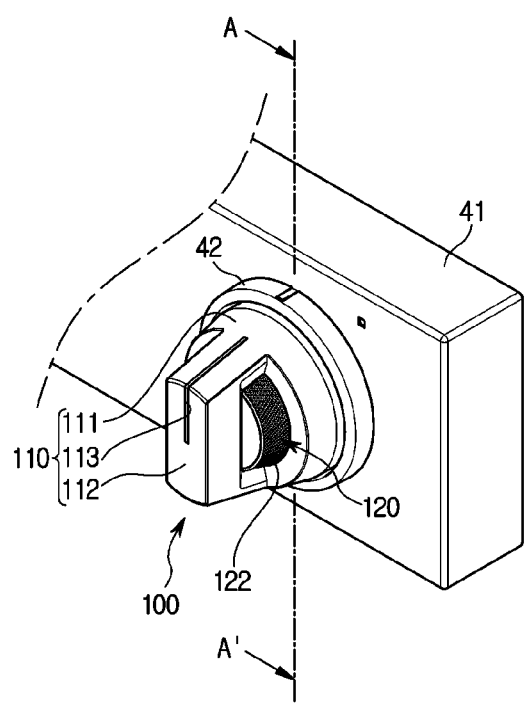
FIG. 4 is a perspective view of a knob assembly disposed on a control panel in the cooking apparatus according to an embodiment of the present disclosure.
Figure 5:
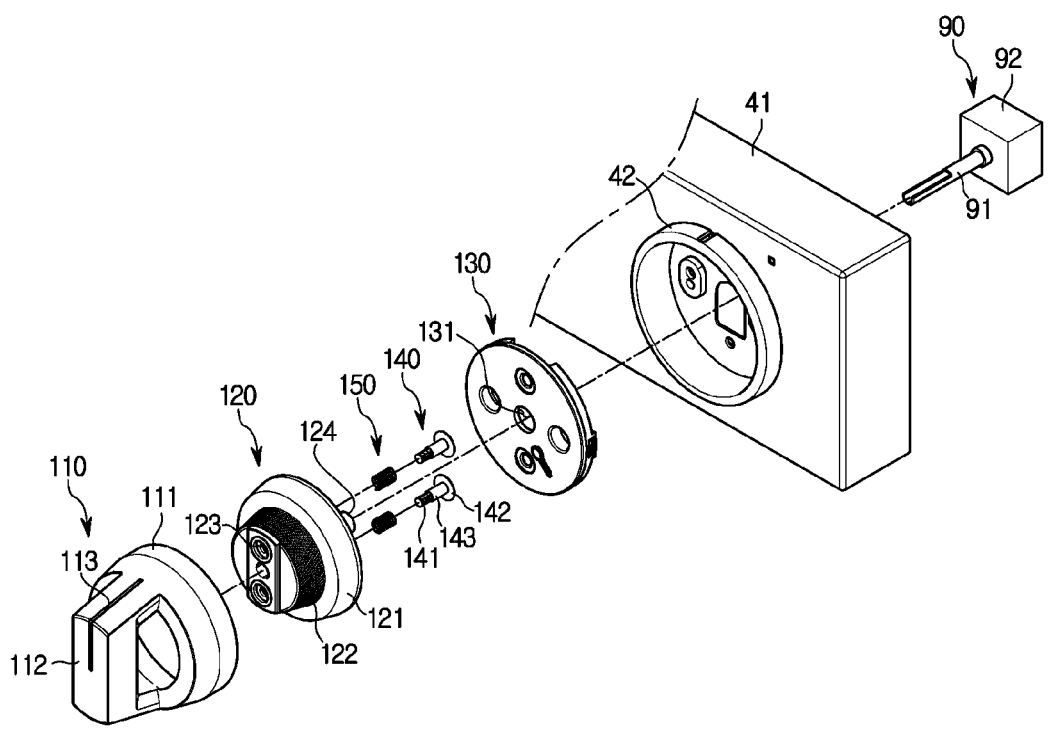
FIG. 5 is an exploded perspective view of the knob assembly disposed on the control panel in the cooking apparatus according to an embodiment of the present disclosure.

FIG. 4 is a perspective view of a knob assembly disposed on a control panel in the cooking apparatus according to an embodiment of the present disclosure. FIG. 5 is an exploded perspective view of the knob assembly disposed on the control panel in the cooking apparatus according to an embodiment of the present disclosure.

As illustrated in FIGS. 4 and 5, the cooking apparatus 1 (see FIG. 1) according to an embodiment of the present disclosure may include a valve 90 disposed inside the main body 10 (see FIG. 1). The valve 90 may include a valve shaft 91 configured to be movable.

The valve 90 may include a control module 92 configured to control a heating source (not shown) of the cooking apparatus 1.

The valve shaft 91 may be coupled to the control module 92 to be able to be pushed and rotated. As the valve shaft 91 is pushed and rotated, the control module 92 may control the operation of the heating source (not shown).

The control module 92 may control the heating source (not shown) by receiving a rotation degree of the valve shaft 91. For example, the control module 92 may control on/off, temperature, etc. of the heating part 31 (see FIG. 1) of the cooktop 30 (see FIG. 1), and may control on/off, temperature, cooking time, cooking mode, etc. of the heater 27 (see FIG. 2).

The cooking apparatus 1 may include the knob assembly 100 provided on the control panel 41 to control a degree of opening and closing of the valve 90. The knob assembly 100 may push and rotate the valve shaft 91 to open the valve 90.

The knob assembly 100 may include a knob cover 110 and a knob body 120 detachably coupled to the knob cover 110. The knob body 120 may be covered by the knob cover 110. A portion of the knob body 120 may be accommodated in the knob cover 110.

The knob cover 110 may include a cover body 111 for accommodating a portion of the knob body 120 and a cover handle 112 extending from the cover body 111 to be gripped by the user. The user may easily rotate the knob cover 110 while holding the protruding cover handle 112 by hand.

The cover body 111 may be provided in a substantially circular column shape, and the cover handle 112 may be provided in a substantially hexahedral shape.

The cover handle 112 may extend from the cover body 111 such that a space is formed between the cover handle 112 and the cover body 111. A portion of the knob body 120 may be positioned in the space between the cover handle 112 and the cover body 111 to be exposed to the outside.

The knob cover 110 may include a display 113. The display 113 may be formed on the cover handle 112. The display 113 may not be formed on only one surface of the cover handle 112, but may be formed over two surfaces. However, the present disclosure is not limited thereto.

The user may easily recognize a state in which the knob assembly 100 is rotated through the display 113.

The knob body 120 may include a body portion 121 covered by the cover body 111 and a push portion 122 extending from the body portion 121 to be pushed by the user. The body portion 121 and the push portion 122 may be provided in a substantially circular column shape.

The body portion 121 may have a larger diameter than the push portion 122. However, the present disclosure is not limited thereto.

The body portion 121 may be covered by the cover body 111 not to be exposed to the outside, and the push portion 122 may be exposed to the outside through the space between the cover body 111 and the cover handle 112.

The user may push the knob body 120 by pushing a portion of the push portion 122 exposed to the outside.

The knob body 120 may include a shaft housing 124 configured to be coupled to the valve shaft 91. As the valve shaft 91 is coupled to the shaft housing 124, the knob body 120 may rotate together with the valve shaft 91. The shaft housing 124 and the valve shaft 91 may be coupled so as not to rotate relative to each other.

The shaft housing 124 may extend from the inside of the knob body 120 along a rotation axis direction of the knob body 120. The valve shaft 91 may be inserted into the shaft housing 124.

A relative rotation prevention protrusion (not shown) may be provided inside the shaft housing 124. The valve shaft 91 may include a relative rotation prevention groove (not shown) recessed along an axial direction to correspond to the relative rotation prevention protrusion (not shown).

When the valve shaft 91 is inserted into the shaft housing 124, the knob body 120 and the valve shaft 91 may not rotate relative to each other by inserting the relative rotation prevention protrusion (not shown) into the relative rotation prevention groove (not shown).

Therefore, as the knob body 120 rotates, the valve shaft 91 also rotates together, the user may rotate the knob body 120 by rotating the knob cover 110, and as the knob body 120 is rotated, the heating source (not shown) may be controlled through the control module 92.

The knob assembly 100 may include a knob base 130 configured to cover one end of the knob body 120. The knob base 130 may be formed in a substantially circular shape. However, the present disclosure is not limited thereto. The knob base 130 may be coupled to a lower portion of the knob cover 110 to form a portion of a lower surface thereof.

The knob base 130 may include a base hole 131 configured such that the shaft housing 124 into which the valve shaft 91 is inserted passes therethrough. The base hole 131 may be provided in the center of the knob base 130. However, the present disclosure is not limited thereto.

The base hole 131 may have a diameter larger than a diameter of the shaft housing 124 so that the shaft housing 124 may reciprocate.

A seating member 42 on which the knob base 130 is seated may be provided on the control panel 41. The seating member 42 may be formed in a substantially circular shape. However, the present disclosure is not limited thereto.

The seating member 42 may be provided to stably support the knob assembly 100 on the control panel 41. The seating member 42 may be provided with a seating member hole 43 (see FIG. 6) configured such that the shaft housing 124 into which the valve shaft 91 is inserted passes therethrough.

The seating member hole 43 may be provided larger than the shaft housing 124 so that the shaft housing 124 may reciprocate. A light emitting member (not shown) that emits light when the knob assembly 100 is operated may be mounted on the mounting member 42.

The knob assembly 100 may include a coupling member 140 configured to couple the knob cover 110 and the knob body 120. The coupling member 140 may couple the knob cover 110 and the knob body 120 so that the knob body 120 is movable.

The coupling member 140 may include a screw. However, the present disclosure is not limited thereto.

The coupling member 140 may include a coupling portion 141 coupled to the knob cover 110 and a head portion 142 configured to restrict the movement of the knob body 120.

The coupling member 140 may include a guide portion 143 provided between the coupling portion 141 and the head portion 142 to guide the movement of the knob body 120. However, the present disclosure is not limited thereto.

The coupling member 140 may include the coupling portion 141, the guide portion 143 extending from the coupling portion 142, and the head portion 142 extending from the guide portion 143.

The coupling member 140 may include only the coupling portion 141 and the head portion 142 extending from the coupling portion 141. That is, the coupling member 140 may be composed of only the coupling portion 141 without the guide portion 143 being separated from the coupling portion 141.

The knob cover 110 may include a cover hole 114 (see FIG. 6) configured such that the coupling portion 141 is coupled thereto, and the knob body 120 may include a body hole 123 configured such that the coupling portion 141 or the guide portion 143 passes therethrough.

An embodiment of the present disclosure illustrates that two of the coupling members 140 are provided, and thus two of the cover holes 114 and body holes 123 to which the coupling members 140 are coupled are provided, but the present disclosure is not limited thereto.

The one or more coupling members 140 may be provided, and the one or more cover holes 114 and body holes 123 may be provided to correspond to the number of the coupling members 140.

The knob assembly 100 may include an elastic member 150 disposed near the push portion 122 so that the knob body 120 may pull the valve shaft 91. The elastic member 150 may include a compression spring. However, the present disclosure is not limited thereto.

When the user completes the use of the cooking apparatus 1, the elastic member 150 may restore the knob body 120 and the valve shaft 91, which are pushed, to original states.

Although a valve spring (not shown) may be provided inside the valve 90 to restore the knob body 120 and the valve shaft 91, which are pushed, to the original states, because an elastic force of the valve spring (not shown) may be insufficient compared to an elastic force required to restore the knob body 120 and the valve shaft 91, which are pushed, to the original states, the elastic member 150 may complement the valve spring (not shown).

Figure 6:
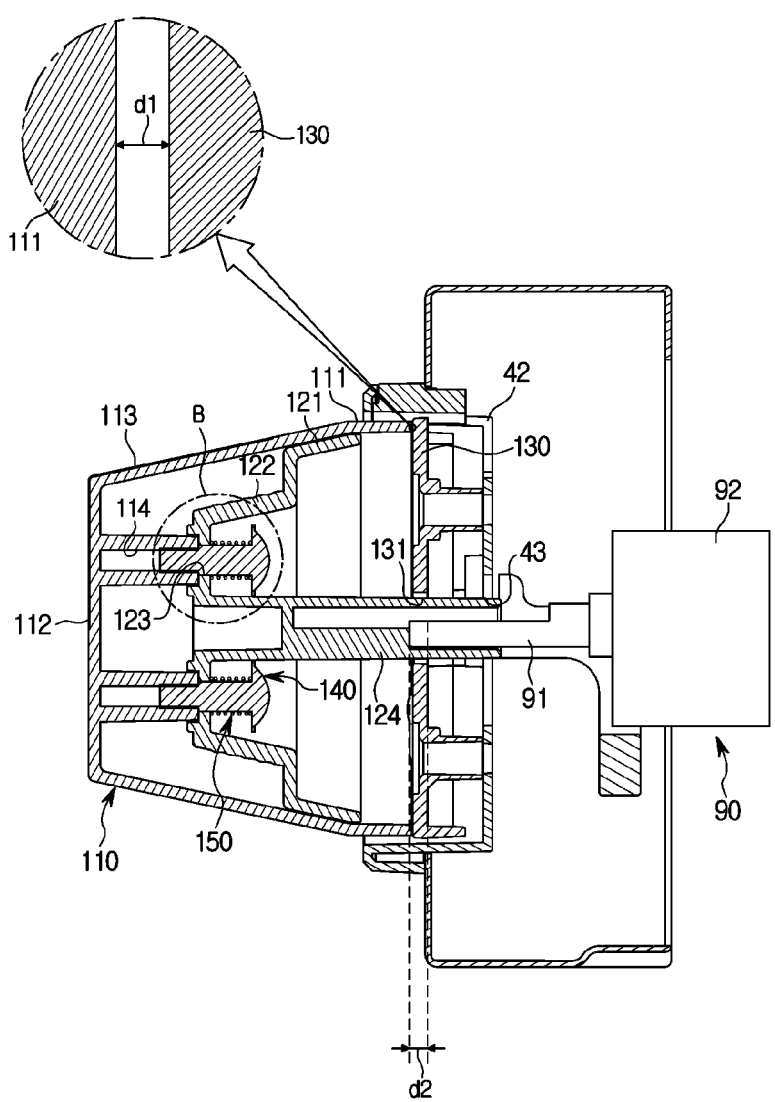
FIG. 6 is a side cross-sectional view of the knob assembly disposed on the control panel in the cooking apparatus according to an embodiment of the present disclosure, which is taken along line A-A' of FIG. 4.
Figure 7:
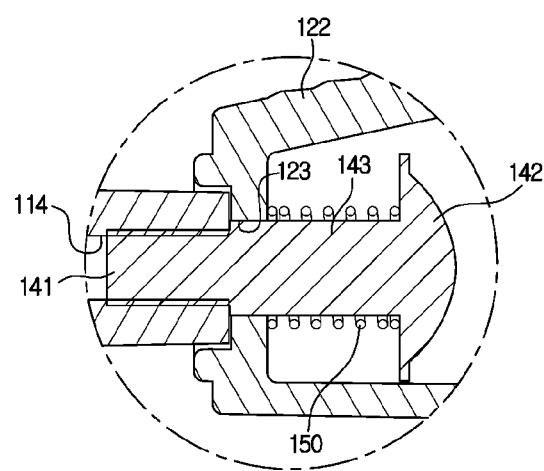
FIG. 7 is an enlarged view of a part B of FIG. 6 in the cooking apparatus according to an embodiment of the present disclosure.
Figure 8:
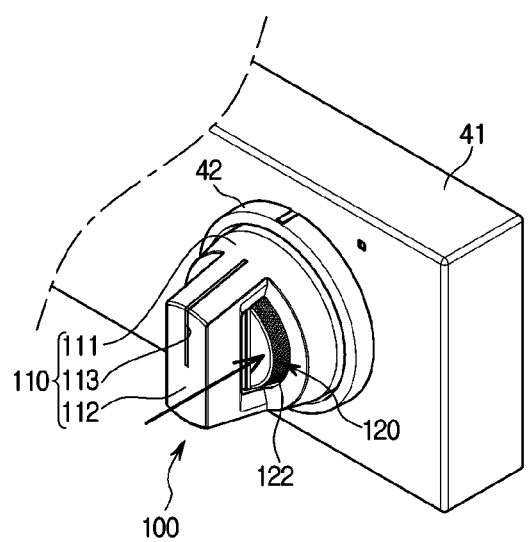
FIG. 8 illustrates that a knob body is pushed separately from a knob cover in the cooking apparatus according to an embodiment of the present disclosure.
Figure 9:
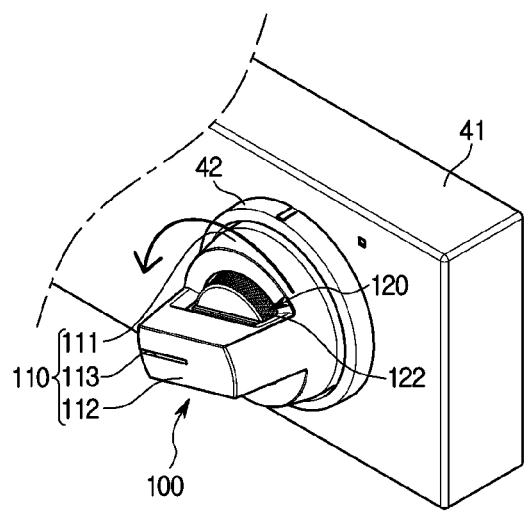
FIG. 9 illustrates that the knob body rotates together with the knob cover while being pushed in the cooking apparatus according to an embodiment of the present disclosure.
Figure 10:
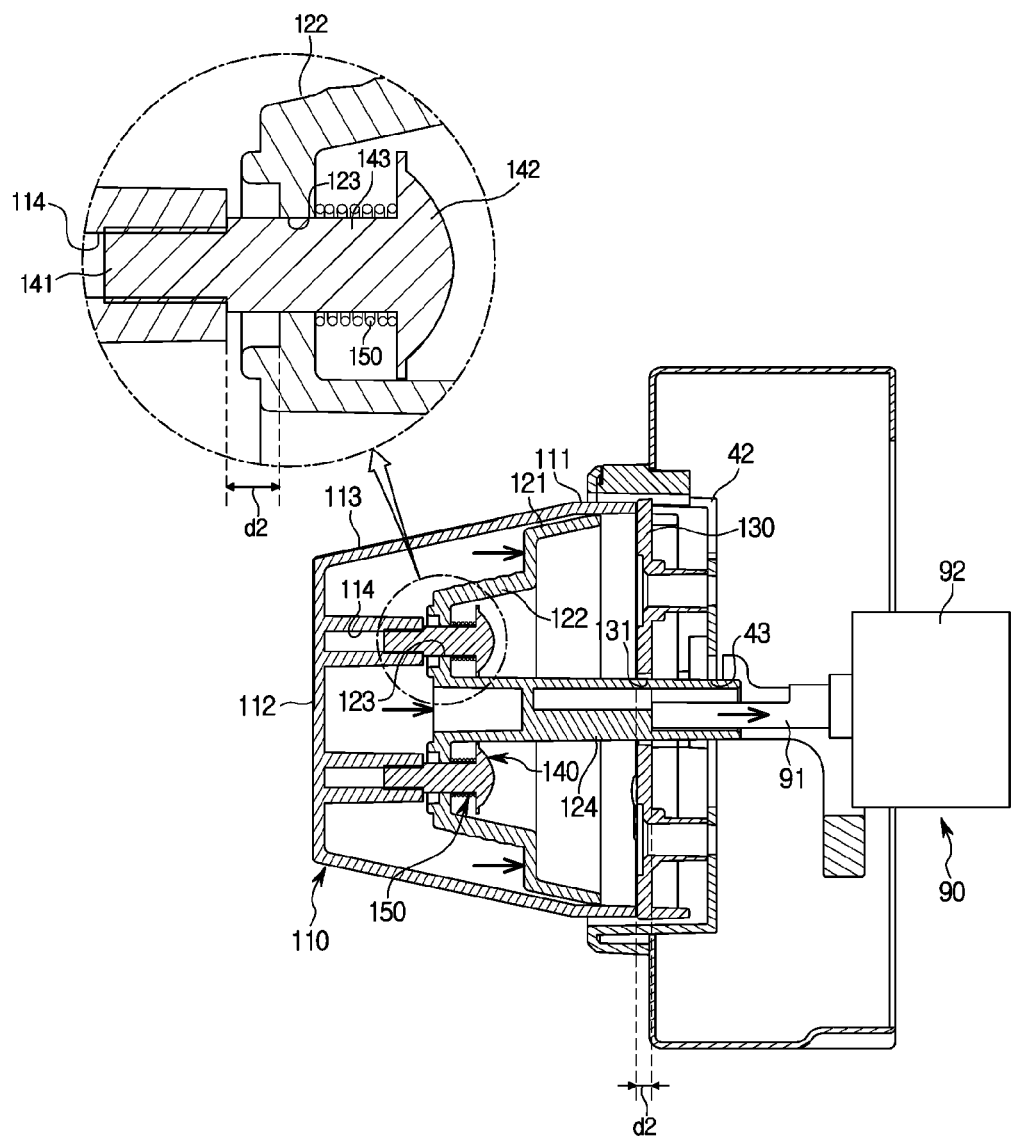
FIG. 10 is a side cross-sectional view illustrating that the knob body is pushed separately from the knob cover in the cooking apparatus according to an embodiment of the present disclosure, which is taken along line A-A' of FIG. 4.

FIG. 6 is a side cross-sectional view of the knob assembly disposed on the control panel in the cooking apparatus according to an embodiment of the present disclosure, which is taken along line A-A' of FIG. 4. FIG. 7 is an enlarged view of a part B of FIG. 6 in the cooking apparatus according to an embodiment of the present disclosure. FIG. 8 illustrates that a knob body is pushed separately from a knob cover in the cooking apparatus according to an embodiment of the present disclosure. FIG. 9 illustrates that the knob body rotates together with the knob cover while being pushed in the cooking apparatus according to an embodiment of the present disclosure. FIG. 10 is a side cross-sectional view illustrating that the knob body is pushed separately from the knob cover in the cooking apparatus according to an embodiment of the present disclosure, which is taken along line A-A' of FIG. 4.

Referring to FIGS. 6 to 10, the knob body 120 may be pushed separately from the knob cover 110 to push the valve shaft 91 in order to prevent the valve shaft 91 from being pushed by the knob cover 110.

In general, a knob cover and a knob body may be integrally configured, and by pushing and rotating the knob cover, the valve shaft 91 may be pushed and rotated to operate a control module.

In this case, the user may operate the control module by unintentionally pushing and rotating the knob cover, thereby causing a fire or the like.

Accordingly, the knob body 120 according to an embodiment of the present disclosure may be pushed by the user independently from the knob cover 110 and the knob body 120 may push the valve shaft 91. That is, the valve shaft 91 may not be pushed simply by pushing the knob cover 110.

The knob assembly 100 may include the knob base 130 disposed near the cover body 111 to prevent the knob cover 110 from being pushed. The movement of the knob cover 110 may be restricted by the knob base 130.

One end of the cover body 111 may be spaced apart from one end of the facing knob base 130 by a first distance d1. The minimum distance to which the valve shaft 91 needs to be moved to open the valve 90 may correspond to a second distance d2.

In order to open the valve 90 to operate the control module 92, the valve shaft 91 needs to be pushed by the knob assembly 100 by the second distance d2.

The first distance d1 may be shorter than the second distance d2. That is, one end of the cover body 111 may be spaced apart from one end of the facing knob base 130 by the first distance d1 shorter than the second distance d2 to which the valve shaft 91 needs to be moved to open the valve 90.

Therefore, even when the user unintentionally pushes the knob cover 110 so that the knob cover 110 is moved by the first distance d1 and the valve shaft 91 is also moved together by the first distance d1, the valve 90 may not be opened.

As the knob cover 110 is moved by the first distance d1 before the valve shaft 91 is moved by the second distance d2 to which the valve shaft 91 needs to be moved to open the valve 90, one end of the cover body 111 may interfere with one end of the facing knob base 130.

As one end of the cover body 111 comes into contact with one end of the facing knob base 130 so that the movement of the knob cover 110 is restricted, the valve shaft 91 may not open the valve 90.

Accordingly, the knob assembly 100 according to an embodiment of the present disclosure may prevent in advance accidents such as a fire that may occur when the user unintentionally pushes the knob cover 110.

As the user pushes the knob body 120, not the knob cover 110 and then rotates the knob cover 110 coupled to the knob body 120, the valve 90 may be opened to operate the control module 92.

One end of the coupling member 140 may be disposed inside the knob body 120 to be spaced apart from one end of the facing knob body 120. The head portion 142 may be spaced apart from the body hole 123 of the knob body 120 configured such that the coupling member 140 passes therethrough.

Accordingly, the knob body 120 may reciprocate as much as a gap between one end of the cover hole 114 and the facing head portion 142.

The knob body 120 may be guided through the guide portion 143. The knob body 120 may be moved by a length of the guide portion 143. Through this, only the knob body 120 can be pushed and moved separately from the knob cover 110.

A distance to which the knob body 120 is pushed and moved may be greater than or equal to the second distance d2 to which the valve shaft 91 needs to be moved to open the valve 90.

Therefore, the valve 90 may be opened through the valve shaft 91 by pushing only the knob body 120. That is, as the knob body 120 is pushed so that a distance between the one end of the cover hole 114 and the facing body hole 123 is equal to or greater than the second distance d2, the valve 90 may be opened through the valve shaft 91.

The elastic member 150 may be disposed between the facing head portion 142 and one end of the push portion 122. The elastic member 150 and the head portion 142 may be accommodated in the knob body 120.

The elastic member 150 may be disposed on the guide portion 143. However, the present disclosure is not limited thereto, and the elastic member 150 may be provided on various positions within a limit in which the elastic force may be provided to the knob body 120 in the direction opposite to the direction in which the knob body 120 is pushed.

When the knob body 120 is pushed to open the valve 90, the elastic member 150 is compressed so that the elastic force may be accumulated, and when the push of the knob body 120 is released, the elastic member 150 may provide the elastic force to the knob body 120 in the direction opposite to the direction in which the knob body 120 is pushed.

Figure 11:
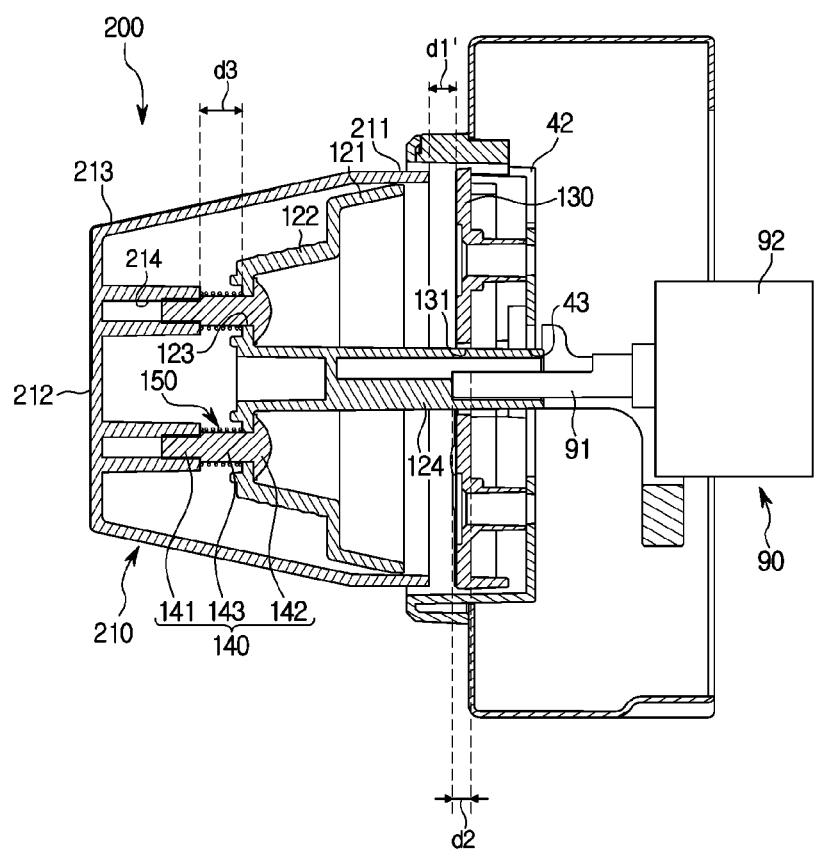
FIG. 11 is a side cross-sectional view of a knob assembly disposed on a control panel in a cooking apparatus according to another embodiment of the present disclosure, which is taken along line A-A' of FIG. 4.

FIG. 11 is a side cross-sectional view of a knob assembly disposed on a control panel in a cooking apparatus according to another embodiment of the present disclosure, which is taken along line A-A' of FIG. 4.

A knob assembly 200 according to another embodiment of the present disclosure is different from the knob assembly 100 according to an embodiment of the present disclosure in the structure of a knob cover 210 and the positions of the coupling member 140 and the elastic member 150.

Components of the knob assembly 200 that are the same as those of the knob assembly 100 according to an embodiment of the present disclosure may have the same reference numerals.

Hereinafter, the knob assembly 200 according to another embodiment of the present disclosure will be described focusing on differences from the knob assembly 100 according to an embodiment of the present disclosure.

As illustrated in FIG. 11, the knob assembly 200 may include the knob cover 210 and the knob body 120 (see FIG. 5) detachably coupled to the knob cover 210.

The knob cover 210 may include a cover body 211 for accommodating a portion of the knob body 120 and a cover handle 212 extending from the cover body 211 to be gripped by a user.

The cover handle 212 may extend from the cover body 211 such that a space is formed between the cover handle 212 and the cover body 211. A portion of the knob body 120 may be positioned in the space between the cover handle 212 and the cover body 211 to be exposed to the outside.

The knob cover 210 may include a display 213. The display 213 may be formed on the cover handle 212. The user may easily recognize a state in which the knob assembly 200 is rotated through the display 213.

The knob assembly 200 may include the coupling member 140 configured to couple the knob cover 210 and the knob body 120. The knob assembly 200 may include the elastic member 150 disposed near the push portion 122 so that the knob body 120 may pull the valve shaft 91.

The coupling member 140 may include the coupling portion 141 coupled to the knob cover 210 and the head portion 142 configured to restrict the movement of the knob body 120.

The coupling member 140 may include the guide portion 143 provided between the coupling portion 141 and the head portion 142 to guide the movement of the knob cover 210.

One end of the coupling member 140 may be disposed inside the knob body 120 to be in contact with one end of the facing knob body 120. The head portion 142 may be in contact with the body hole 123 of the knob body 120 configured such that the coupling member 140 passes therethrough.

The knob assembly 200 may include the knob base 130 disposed near the cover body 211 to prevent the knob cover 210 from being pushed to push the valve shaft 91. The movement of the knob cover 210 may be restricted by the knob base 130.

One end of the cover body 211 may be spaced apart from one end of the facing knob base 130 by a first distance d1'. The minimum distance to which the valve shaft 91 needs to be moved to open the valve 90 may correspond to the second distance d2.

In order to open the valve 90 to operate the control module 92, the valve shaft 91 needs to be pushed by the knob assembly 200 by the second distance d2.

The first distance d1' may be longer than the second distance d2. That is, one end of the cover body 211 may be spaced apart from one end of the facing knob base 130 by the first distance d1' longer than the second distance d2 to which the valve shaft 91 needs to be moved to open the valve 90.

When the knob body 120 of the knob assembly 200 according to another embodiment of the present disclosure is pushed by the user, the knob body 120 may be moved together with the knob cover 110 coupled by the coupling member 140.

That is, as one end of the knob body 120 on which the body hole 123 is disposed interferes with the head portion 142, the knob cover 110 may be moved together with the knob body 120.

Therefore, in a case where the first distance d1' is shorter than the second distance d2 as in the knob assembly 100 according to an embodiment of the present disclosure, the knob cover 210 moved together with the knob body 120 first interferes with one end of the facing knob base 130 before the knob body 120 is pushed to open the valve 90, so that the movement of the knob cover 210 may be restricted.

Accordingly, because the movement of the knob body 120 is also restricted, in order to open the valve 90 by pushing the knob body 120, the first distance d1' between one end of the cover body 211 and one end of the facing knob base 130 may be spaced apart to the first distance d1' that is longer than the second distance d2 to which the valve shaft 91 needs to be moved to open the valve 90.

The knob cover 210 may include a cover hole 214 configured such that the coupling portion 141 is coupled thereto. One end of the cover hole 214 and one end of the facing body hole 123 may be spaced apart from each other by a third distance d3. The knob cover 210 may reciprocate by a first distance d1'.

The third distance d3 may be greater than or equal to the first distance d1'. That is, the third distance d3 by which one end of the cover handle 212 is spaced apart from one end of the facing knob body 120 may be longer than the first distance d1' by which one end of the cover body 211 is spaced apart from one end of the facing knob base 130.

Therefore, one end of the cover body 211 may first come into contact with one end of the facing knob base 130 before the knob cover 210 is pushed and moved to push the knob body 120. The movement of the knob cover 210 may be restricted by the knob base 130.

Therefore, in the knob assembly 200 according to another embodiment of the present disclosure, the valve shaft 91 may not be pushed simply by pushing the knob cover 210.

When only the knob cover 210 is pushed, only the knob cover 210 and the coupling member 140 coupled to the knob cover 210 may be pushed and moved. That is, when the knob cover 210 is pushed, the guide portion 143 may be guided through the body hole 123.

Therefore, because the knob body 120 is not moved even when the knob cover 210 is moved by the first distance d1' as the user unintentionally pushes the knob cover 210, the valve 90 may not be opened.

Accordingly, the knob assembly 200 according to another embodiment of the present disclosure may prevent in advance accidents such as a fire that may occur when the user unintentionally pushes the knob cover 210.

As the user pushes the knob body 120, not the knob cover 210 and then rotates the knob cover 210 coupled to the knob body 120, the valve 90 may be opened to operate the control module 92.

The elastic member 150 may be disposed between the knob cover 210 and the knob body 120. The elastic member 150 may be disposed between the cover handle 212 and one end of the knob body 120. The elastic member 150 may be disposed between one end of the cover hole 214 and one end of the body hole 123, which face each other.

The elastic member 150 may be disposed in a space between the cover handle 212 and the cover body 211 to be exposed to the outside.

When the knob cover 210 is pushed, the elastic member 150 is compressed so that the elastic force may be accumulated, and when the push of the knob cover 210 is released, the elastic member 150 may provide the elastic force to the knob cover 210 in the direction opposite to a direction in which the knob cover 210 is pushed.

The elastic member 150 may be disposed on the guide portion 143. However, the present disclosure is not limited thereto, and the elastic member 150 may be provided on various positions within a limit in which the elastic force may be provided to the knob cover 210 in the direction opposite to the direction in which the knob cover 210 is pushed.

The knob body 120 is not moved by the valve spring (not shown) in the direction opposite to the direction in which the knob body 120 is pushed by the elastic member 150 and may maintain a gap with the knob cover 210.

Figure 12:
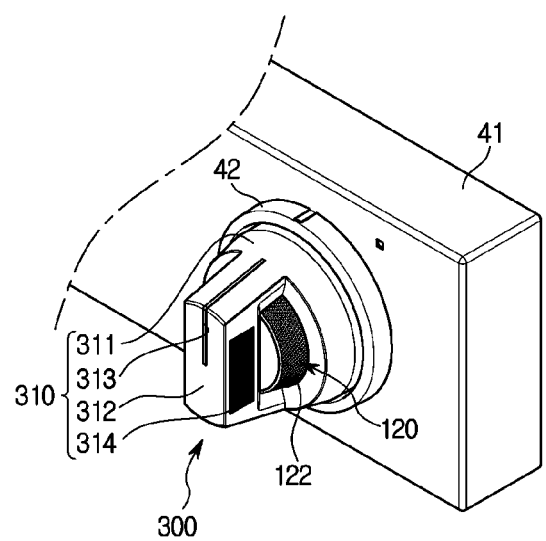
FIG. 12 illustrates a controller provided on a knob cover in a cooking apparatus according to another embodiment of the present disclosure.

FIG. 12 illustrates a controller provided on a knob cover in a cooking apparatus according to another embodiment of the present disclosure.

A knob assembly 300 according to another embodiment of the present disclosure is different from the knob assembly 100 according to an embodiment of the present disclosure in the structure of a knob cover 310. Components of the knob assembly 300 that are the same as those of the knob assembly 100 according to an embodiment of the present disclosure may have the same reference numerals.

Hereinafter, the knob assembly 300 according to another embodiment of the present disclosure will be described focusing on differences from the knob assembly 100 according to an embodiment of the present disclosure.

As illustrated in FIG. 12, the knob assembly 300 may include the knob cover 310 and the knob body 120 detachably coupled to the knob cover 310.

The knob cover 310 may include a cover body 311 for accommodating a portion of the knob body 120 and a cover handle 312 extending from the cover body 311 to be gripped by a user.

The cover body 311 may be provided in a substantially circular column shape, and the cover handle 312 may be provided in a substantially hexahedral shape.

The cover handle 312 may extend from the cover body 311 such that a space is formed between the cover handle 312 and the cover body 311. A portion of the knob body 120 may be positioned in the space between the cover handle 312 and the cover body 311 to be exposed to the outside.

The knob cover 310 may include a display 313. The display 313 may be formed on the cover handle 312. The user may easily recognize a state in which the knob assembly 300 is rotated through the display 313.

The knob cover 310 may include a controller 314 configured to control that the valve shaft 91 (see FIG. 5) is pushed by the knob cover 310.

The controller 314 may control that the valve shaft 91 is pushed by the knob cover 310 through an electronic or mechanical configuration.

The controller 314 may be disposed on the cover handle 312. However, the present disclosure is not limited thereto, and the controller 314 may be disposed on various positions within a limit in which the controller 314 may control that the valve shaft 91 is pushed by the knob cover 310.

For example, the controller 314 may be disposed on the cover body 311, the knob body 120, the control panel 41, the seating member 42, or the main body 10 (see FIG. 1).

The controller 314 may include a touch portion. Accordingly, the user may touch the touch portion in order to open the valve 90 by pushing and rotating the knob cover 310. The touch portion may operate by recognizing a fingerprint of the user. However, the present disclosure is not limited thereto.

The controller 314 may include a switch. Accordingly, the user may operate the switch in order to open the valve 90 by pushing and rotating the knob cover 310. The switch may include a button switch and the like. However, the present disclosure is not limited thereto.

Accordingly, the knob assembly 300 according to another embodiment of the present disclosure may prevent in advance accidents such as a fire that may occur when the user unintentionally pushes the knob cover 310.

While the present disclosure has been particularly described with reference to exemplary embodiments, but the scope of rights of the present disclosure is not limited to these embodiments.

Various embodiments that may be modified or modified by those skilled in the art of the present disclosure would also be within the scope of the present disclosure, without departing from the gist of the present disclosure specified in the claims.

The invention claimed is:

1. A cooking apparatus comprising:
a main body comprising a control panel;
a valve disposed inside the main body and comprising a valve shaft configured to be movable; and
a knob assembly comprising a knob cover rotatably disposed on the control panel, a knob body configured to be pushed separately from the knob cover to push the valve shaft so that the valve shaft is prevented from being pushed by the knob cover, and a coupling member configured to couple the knob cover and the knob body so that the knob body is movable,
wherein the coupling member comprises a coupling portion coupled to the knob cover and a head portion configured to restrict the movement of the knob body.

2. The cooking apparatus according to claim 1, wherein:
the knob cover comprises a cover body configured such that a portion of the knob body is accommodated and a cover handle extending from the cover body to be gripped by a user; and
the knob assembly further comprises a knob base disposed near the cover body to prevent the knob cover from being pushed.

3. The cooking apparatus according to claim 2, wherein a distance by which one end of the cover body is spaced apart from one end of the knob base facing the one end of the cover body is shorter than a distance to which the valve shaft is moved to open the valve.

4. The cooking apparatus according to claim 1, wherein:
the head portion is spaced apart from a body hole of the knob body configured such that the coupling member passes therethrough.

5. The cooking apparatus according to claim 4, wherein:
the knob body comprises a body portion covered by a cover body and a push portion extending from the body portion; and
the knob assembly further comprises an elastic member disposed near the push portion so that the knob body pulls the valve shaft.

6. The cooking apparatus according to claim 5, wherein the elastic member is disposed between the head portion and one end portion of the push portion facing each other.

7. The cooking apparatus according to claim 6, wherein the elastic member and the head portion are accommodated in the knob body.

8. The cooking apparatus according to claim 5, wherein the coupling member further comprises a guide portion provided between the coupling portion and the head portion to guide the movement of the knob body.

9. The cooking apparatus according to claim 8, wherein the elastic member is disposed on the guide portion.

10. The cooking apparatus according to claim 2, wherein a distance by which one end of the cover handle is spaced apart from one end of the knob body facing the one end of the cover handle is longer than a distance by which one end of the cover body is spaced apart from one end of the knob base facing the one end of the cover body.

11. The cooking apparatus according to claim 2, wherein a distance by which one end of the cover body is spaced apart from one end of the knob base facing the one end of the cover body is longer than a distance to which the valve shaft is moved to open the valve.

12. The cooking apparatus according to claim 2, wherein the knob assembly further comprises an elastic member disposed between the cover handle and one end of the knob body facing each other.

13. The cooking apparatus according to claim 1, wherein the knob cover comprises a touch portion configured to control the valve shaft to be pushed by the knob cover.

* * * * *